United States Patent
Bekmann et al.

(10) Patent No.: US 10,019,641 B2
(45) Date of Patent: Jul. 10, 2018

(54) BACKGROUND OCR DURING CARD DATA ENTRY

(71) Applicant: Square, Inc., San Francisco, CA (US)

(72) Inventors: Joachim Bekmann, San Francisco, CA (US); Fei Guo, Sunnyvale, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/284,462

(22) Filed: Oct. 3, 2016

(65) Prior Publication Data

US 2017/0147894 A1 May 25, 2017

Related U.S. Application Data

(63) Continuation of application No. 15/008,177, filed on Jan. 27, 2016, now Pat. No. 9,483,760, which is a
(Continued)

(51) Int. Cl.
*G06K 9/34* (2006.01)
*G06Q 20/34* (2012.01)
(Continued)

(52) U.S. Cl.
CPC ......... *G06K 9/344* (2013.01); *G06K 9/00442* (2013.01); *G06K 9/00469* (2013.01);
(Continued)

(58) Field of Classification Search
CPC ........... G06K 9/00442; G06K 9/00469; G06K 9/00979; G06K 9/03; G06K 9/033;
(Continued)

(56) References Cited

U.S. PATENT DOCUMENTS

| 5,235,651 A | 8/1993 | Nafarieh |
| 7,970,213 B1 | 6/2011 | Ruzon et al. |
| (Continued) | | |

FOREIGN PATENT DOCUMENTS

| EP | 1530122 | * 5/2005 | ............ G06F 3/033 |
| EP | 2 752 790 A2 | 7/2014 | |
| (Continued) | | | |

OTHER PUBLICATIONS

Notice of Allowance dated Dec. 30, 2015, for U.S. Appl. No. 14/548,152, of Bekmann, J., et al., filed Nov. 19, 2014.
(Continued)

*Primary Examiner* — Amara Abdi
(74) *Attorney, Agent, or Firm* — Baker Botts L.L.P.

(57) ABSTRACT

Financial transaction card data can be entered by providing a picture of the card to a server programmed with a text recognition algorithm. The server can perform text recognition on the image at the same time that a consumer enters additional required data, such as a zip code. The server can perform as much text recognition processing as possible in the time the consumer is entering the additional data. Once the additional data is received, a signal can be provided to the server indicating that the user is now waiting for results of the text recognition process, meaning the server should provide them as quickly as possible. Once text recognition results are received, a consumer can make a selection to identify a character which the text recognition algorithm did not sufficiently identify. Based on known account number constraints, the user selection can cause multiple characters to be identified.

7 Claims, 7 Drawing Sheets

Related U.S. Application Data continuation of application No. 14/548,152, filed on Nov. 19, 2014, now Pat. No. 9,324,070, which is a continuation of application No. 14/531,518, filed on Nov. 3, 2014.

(51) Int. Cl.

| | | |
|---|---|---|
| *G06K 9/00* | (2006.01) | |
| *G06K 9/18* | (2006.01) | |
| *G06Q 20/32* | (2012.01) | |
| *G06Q 20/40* | (2012.01) | |
| *G06K 9/20* | (2006.01) | |
| *G06K 9/62* | (2006.01) | |
| *G07F 7/12* | (2006.01) | |
| *G06K 9/03* | (2006.01) | |
| *G06K 9/72* | (2006.01) | |
| *G06T 7/73* | (2017.01) | |
| *G06K 9/52* | (2006.01) | |
| *G06T 11/60* | (2006.01) | |

(52) U.S. Cl.
CPC .......... *G06K 9/00979* (2013.01); *G06K 9/03* (2013.01); *G06K 9/033* (2013.01); *G06K 9/18* (2013.01); *G06K 9/2081* (2013.01); *G06K 9/52* (2013.01); *G06K 9/6215* (2013.01); *G06K 9/726* (2013.01); *G06Q 20/3223* (2013.01); *G06Q 20/3276* (2013.01); *G06Q 20/34* (2013.01); *G06Q 20/401* (2013.01); *G06Q 20/4018* (2013.01); *G06T 7/74* (2017.01); *G06T 11/60* (2013.01); *G07F 7/122* (2013.01); *G06K 2209/01* (2013.01)

(58) Field of Classification Search
CPC ........ G06K 9/18; G06K 9/2081; G06K 9/344; G06K 9/52; G06K 9/6215; G06K 9/726; G06K 2209/01; G06Q 20/3223; G06Q 20/3276; G06Q 20/34; G06Q 20/401; G06Q 20/4018; G06T 11/60; G06T 7/74; G07F 7/122

See application file for complete search history.

(56) References Cited

U.S. PATENT DOCUMENTS

| | | |
|---|---|---|
| 8,805,125 B1 | 8/2014 | Kumar et al. |
| 9,147,275 B1 | 9/2015 | Hyde-Moyer et al. |
| 9,324,070 B1 | 4/2016 | Bekmann et al. |
| 9,483,760 B2 | 11/2016 | Bekmann et al. |
| 2005/0216564 A1* | 9/2005 | Myers ................ G06K 9/00456 709/206 |
| 2007/0133874 A1 | 6/2007 | Bressan et al. |
| 2010/0194690 A1 | 8/2010 | Wilairat |
| 2012/0143760 A1 | 6/2012 | Abulafia et al. |
| 2012/0239542 A1 | 9/2012 | Preston et al. |
| 2012/0284185 A1 | 11/2012 | Mettler et al. |
| 2013/0004076 A1 | 1/2013 | Koo et al. |
| 2013/0085908 A1* | 4/2013 | Singh ................ G06Q 10/06 705/30 |
| 2013/0223721 A1 | 8/2013 | Nepomniachtchi et al. |
| 2013/0297353 A1 | 11/2013 | Strange et al. |
| 2014/0078559 A1 | 3/2014 | Wu |
| 2014/0099001 A1 | 4/2014 | Nepomniachtchi et al. |
| 2014/0126825 A1* | 5/2014 | Luo ................ G06Q 10/10 382/190 |
| 2014/0143143 A1 | 5/2014 | Fasoli et al. |
| 2014/0267072 A1 | 9/2014 | Andersson et al. |
| 2014/0270329 A1* | 9/2014 | Rowley ................ G06K 9/46 382/100 |
| 2014/0279516 A1* | 9/2014 | Rellas ................ G06Q 30/0185 705/44 |
| 2015/0046276 A1 | 2/2015 | Artman et al. |
| 2015/0370779 A1 | 12/2015 | Dixon et al. |
| 2015/0379502 A1* | 12/2015 | Sharma ............. G06Q 20/3276 705/39 |
| 2016/0019439 A1* | 1/2016 | Wang ................ G06K 9/2054 382/183 |
| 2016/0125387 A1 | 5/2016 | Bekmann et al. |

FOREIGN PATENT DOCUMENTS

| | | |
|---|---|---|
| KR | 10-0718185 B1 | 5/2007 |
| KR | 10-2016-0085343 A | 7/2016 |
| WO | 2016/073359 A1 | 5/2016 |

OTHER PUBLICATIONS

Notice of Allowance dated Jul. 1, 2016, for U.S. Appl. No. 15/008,177, of Bekmann, J., et al., filed Jan. 27, 2016.
International Search Report and Written Opinion for PCT Application No. PCT/US2015/058626, dated Feb. 17, 2016.
Non-Final Office Action dated May 2, 2017, for U.S. Appl. No. 14/531,518, of Bekmann, J., et al., filed Nov. 3, 2014.
Extended European Search Report dated Nov. 2, 2017 in corresponding European Patent Application No. 15856861.8, 10 pages.
Supplementary European Search Report, dated Nov. 21, 2017, in corresponding European Application No. 15856861.8, 11 pages.
Final Office Action dated Oct. 12, 2017, for U.S. Appl. No. 14/531,518, of Bekmann, J., et al., filed Nov. 3, 2014.

\* cited by examiner

BACKGROUND OCR DURING CARD DATA ENTRY

PRIORITY CLAIM

This application is a continuation of U.S. patent application Ser. No. 15/008,177, entitled "BACKGROUND OCR DURING CARD DATA ENTRY" and filed on Jan. 27, 2016, which is a continuation of U.S. patent application Ser. No. 14/548,152, entitled "BACKGROUND OCR DURING CARD DATA ENTRY" and filed on Nov. 19, 2014, which is a continuation of U.S. patent application Ser. No. 14/531,518, entitled "BACKGROUND OCR DURING CARD DATA ENTRY" and filed on Nov. 3, 2014, the contents of which is expressly incorporated by reference herein.

BACKGROUND

In the United States alone, over twenty-five billion transactions are performed each year using financial transaction cards. Performing a transaction using a financial transaction card can be accomplished in a variety of ways, such as by using an electronic card reader and by entering account data imprinted or written on a financial transaction card.

There are multiple interfaces that can be employed to enter data that has been imprinted or written on the financial transaction card. These interfaces include push-button or virtual keyboards or other text entry devices, microphones or other sound detection devices, cameras or other light detection devices, imprint readers or other contour detection devices, etc.

In some cases, such interfaces can be part of, or attached to, mobile computing devices. Data from these interfaces can be processed locally and can be sent to other computing devices such as servers for further processing.

BRIEF DESCRIPTION OF THE DRAWINGS

Embodiments of the present invention will be described and explained through the use of the accompanying drawings in which.

DETAILED DESCRIPTION

Figure 1:
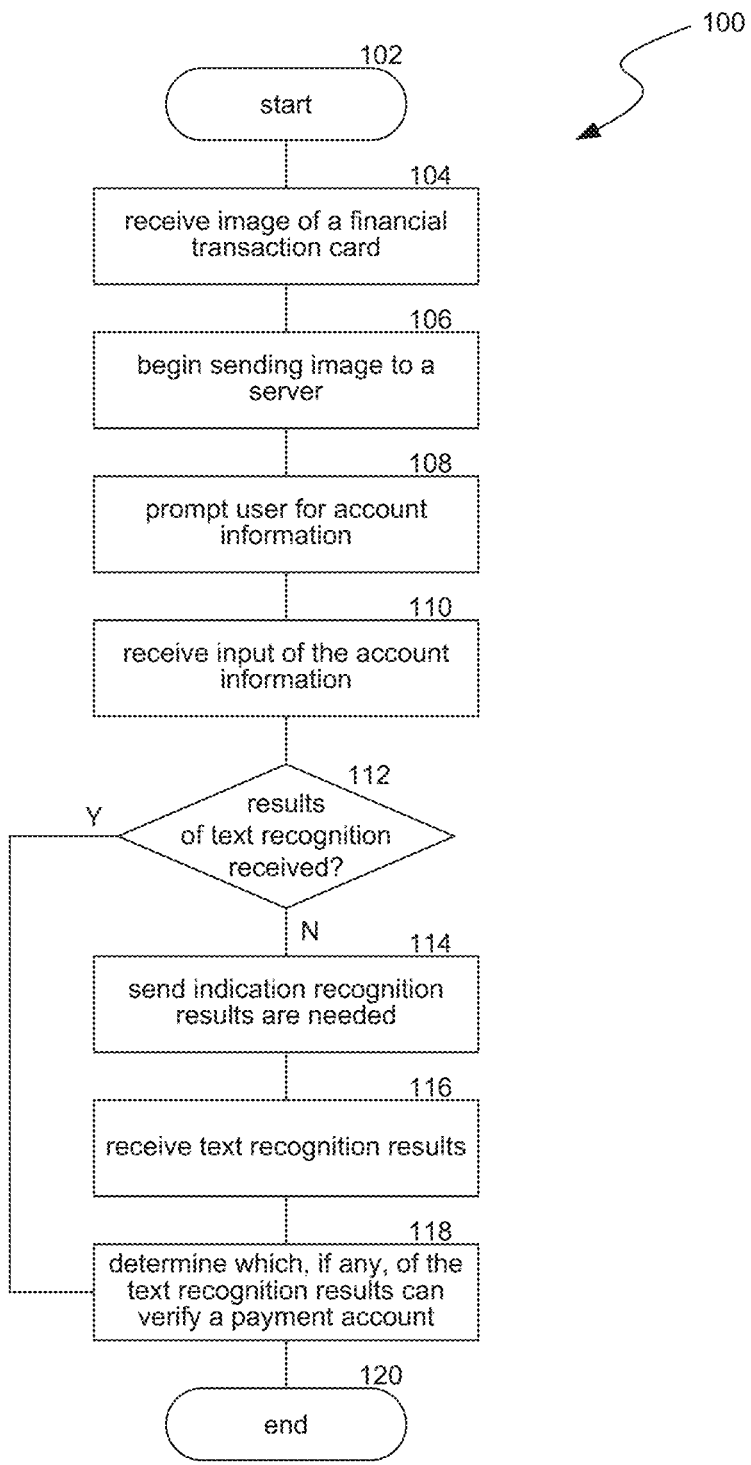
FIG. 1 is a flow diagram illustrating a process used in some embodiments for performing background text recognition during financial transaction card data entry.

Account information can be entered using financial transaction card imaging by providing server communication and text recognition processing while additional account data is being entered. As used herein, "financial transaction cards" comprise any of credit cards, debit cards, pre-paid cards, charge cards, RFID or other near field transmitters, or any other payment device encoded with information configured to allow access to one or more payment accounts, including virtual credit cards such as transmitters within a mobile device. As used herein, this encoded information configured to allow access to one or more payment accounts is referred to as "account data" or "account access data," which for example can include account numbers, account owner name, account owner address, financial transaction card expiration data, "card verification value" (cvv), financial transaction card issuers, signature, etc. As used herein, a "card storage medium" is a memory, as defined below, included with a financial transaction card that stores account data. Some of the account data can also be printed or imprinted on a financial transaction card, which is referred to herein as "printed account data."

Acquiring account data from a financial transaction card can be performed using a variety of techniques, such as directly reading account data from a card storage medium by a card reader attached to a mobile device such as smart phones, tablets, or other computing devices. In some instances, such as when a card reader is not available, fails, or is used improperly, account data may instead be entered through other computing device interfaces. For example, users who wish to register their credit card with a service through an app on their phone are unlikely to have an attached card reader. These users can be required to manually enter the printed account data from their credit card into form fields.

However, manually entering printed account data, such as by typing it with a keyboard or speaking it into a microphone, can be time consuming and error prone. An alternate method for entering printed account data is by submitting an image of the financial transaction card showing the printed account data. Such an image can be acquired, for example, by a camera integrated into a mobile device. Text recognition techniques can be applied to the image to generate printed account data. In some implementations, text recognition techniques can be applied by sending an image to a server to generate possible versions of the printed account data. Additional user input, such as portions of an address, a name, a card expiration, a cvv, a phone number, an email, etc., can be required to finalize entering account data.

The process of uploading a financial transaction card image to a server or executing a text recognition algorithm on the image can be lengthy, causing a negative user experience. In addition, to minimize the amount of time the user is made to wait for a server response, the text recognition process can be implemented such that it provides less than optimal results to save time. Thus, it can be beneficial to perform image uploading or text recognition concurrently with prompting and receiving additional account data. By performing these processes in parallel, a server can provide text recognition results while reducing the user's total wait time, thereby improving the user experience. In addition, by providing an indication to the server once the additional user input process is complete, the server can be allowed additional time to perform the text recognition processing, instead of having to provide a response as soon as possible. This can improve overall accuracy of the system.

For example, a merchant without a card reader, who does not want to forgo a potential credit card transaction, may use an application on a mobile device to perform the transaction by receiving printed account data. The merchant can submit an image of a financial transaction card using a camera on the mobile device. The merchant can then be prompted to enter additional information, such as the card expiration date, cvv, and the customer's name and zip code. While the merchant or customer enters this information, the image can be transmitted to a server for text recognition. The server can continue applying additional text recognition algorithms and techniques until the server receives a signal that the requested additional information for the transaction has been received, so the text recognition results are needed. The server can then provide one or more versions of results of the text recognition to be used for the transaction. In this scenario, the only processing wait time experienced by the merchant and customer is the time for the results of the text recognition to arrive to the merchant's mobile device, while the server is able to use all the available time to optimize the text recognition results.

The text recognition process of transforming an image of printed account data into multiple discrete values can, when it is unclear what value should be assigned to a particular number or character in the image, result in multiple possible versions of the discrete values. When this occurs, input can be required to manually select one or more of the unknown characters. However, in some cases, a user can be required to select multiple unknown characters, which lengthens the account data entry process. Thus, it can be beneficial to use additional available information, such as a Luhn number, issuer identification number, or combinations of possible versions of the printed account data, such that a single character selection can reduce the number of other character selections required.

Continuing the previous example, if the server's text recognition process returned twenty-five distinct possible versions of the printed account data, each with a confidence score, the merchant's mobile device can select the version with the highest score as a best guess and display it to a user with options for selecting alternates for characters that have an individual confidence score below a particular threshold. For example, the third character of the best guess could be a "3," but, a confidence score for this character could be 50%, which is lower than an 85% character confidence score threshold. Of the alternate possible versions of the printed account data, there could be two others indicating "1" and "8" respectively, with a confidence score for the third character above another character viability threshold, such as 20%. A prompt can be provided to the user to select "1," "3," or "8." Upon receiving a character selection of "8," the possible versions of the printed account data that do not have an "8" in the third position can be eliminated. In addition, one or more other characters of the best guess can be transitioned from needing a selection to being sufficiently determinant by removing possible versions of the printed account data that, with 8 set as the third character position do not satisfy the Luhn algorithm or do not match any issuer identification number. In some implementations, a request for a character selection does not use a second threshold and a reduced set of numbers. In these implementations, a user can selected a character from the 0-9 characters for character positions with a confidence score below a threshold.

The update based on the character selection can result in a selection of a new best guess from the remaining possible versions of the printed account data. If this best guess can be validated it can be selected as the account data for the customer, and the transaction is completed with this account data.

Several embodiments of the described technology are discussed below in more detail in reference to the figures. Those skilled in the art will appreciate that the blocks illustrated in each of the diagrams discussed below may be altered in a variety of ways. For example, the order of the logic may be rearranged, sub steps may be performed in parallel, illustrated logic may be omitted, other logic may be included, etc.

FIG. 1 is a flow diagram illustrating a process 100 used in some embodiments for performing background text recognition during card data entry. Process 100 can be used, for example, in any instance where it is desirable to enter printed account data from a financial transaction card. Process 100 can, for example, be performed by a mobile device as part of any process that requires printed account data, such as linking a financial transaction card to a service provided by a payment service system or as part of completing a transaction. Process 100 begins at block 102 and continues to block 104. At block 104, an image of a financial transaction card is received. This image can be received from a camera coupled to a device performing process 100 or can be an image acquired elsewhere and stored on the device. Though process 100 is described as using a single image, in some implementations multiple images may be used showing the same or different portions of the financial transaction card. For example, the image can include front and back images of the financial transaction card. Alternatively or in addition, the image can include multiple images of the front of the financial transaction card, which can be used by a server to improve a text recognition procedure. In some implementations, an application can guide a user in the acquisition of the financial transaction card image, such as by providing a screen overlay to direct card alignment, camera distance, lighting conditions, etc.

At block 106, a transmission is initiated to send the received image to another computing device, such as a server, to perform text recognition. The initiated transmission can continue in parallel with the operations performed in any of blocks 108-114.

At block 108, a prompt is provided for additional account information. The prompt can, for example, display a form with fields indicating additional needed information such as a card holder's name, zip code or other address information, phone number, email address, card expiration data, or cvv. At block 110, input is received indicating the additional account information.

At block 112, process 100 computes whether a response has been received with text recognition results for the image of the financial transaction card. If so process 100 continues to block 118. If not, process 100 continues to block 114. At block 114, an indication is provided to the other computing device performing the text recognition that results of the text recognition are needed.

At block 116, results of the text recognition are received from the other computing device performing the text recognition. The text recognition results can be limited to one or more portions of the printed account data shown in the image of the financial transaction card, such as the account number, or can include other data shown in the image of the financial transaction card, such as the expiration date, card holder name, or cvv. In some implementations, text recognition results can include multiple versions of text recognition results. Each version of text recognition results can have an associated confidence score. In addition or alternatively, various portions of one or more versions of the text recognition results, such as individual characters, can each have its own confidence score. A "confidence score," as used herein, can indicate an estimation as to the accuracy of a text recognition procedure.

At block 118, process 100 computes whether any of the versions of text recognition results can be verified. This determination can include contacting a financial institution that issued the financial transaction card and providing one or more of the versions of text recognition results together with some or all of the additional account information received at block 110. The financial institution can then verify that this is accurate account data. In some implementations, the validity determination can include first eliminating some of the versions of text recognition results by receiving selections for portions of versions of the text recognition results with a confidence score below a threshold. Receiving selections and eliminating versions of text recognition results is discussed in more detail below in relation to FIGS. 2 and 4. In some implementations, the verification in block 118 occurs by a user performing an inspection of one or more of the versions of text recognition results and verifying that one is correct. In some implementations, a version of the text recognition results is selected according to a highest confidence score, and no separate verification is performed.

Once the account data has been received, it can be stored or sent to another device for use or storage. For example, the account data can be sent to a server configured to link the financial transaction card to a service provided by a payment service system by storing the account data with an association to the user and the service provided by the payment service system. As a second example, the account data can be sent to a server configured to use that account data to perform a transaction. Process 100 then continues to block 120, where it ends.

Figure 2:
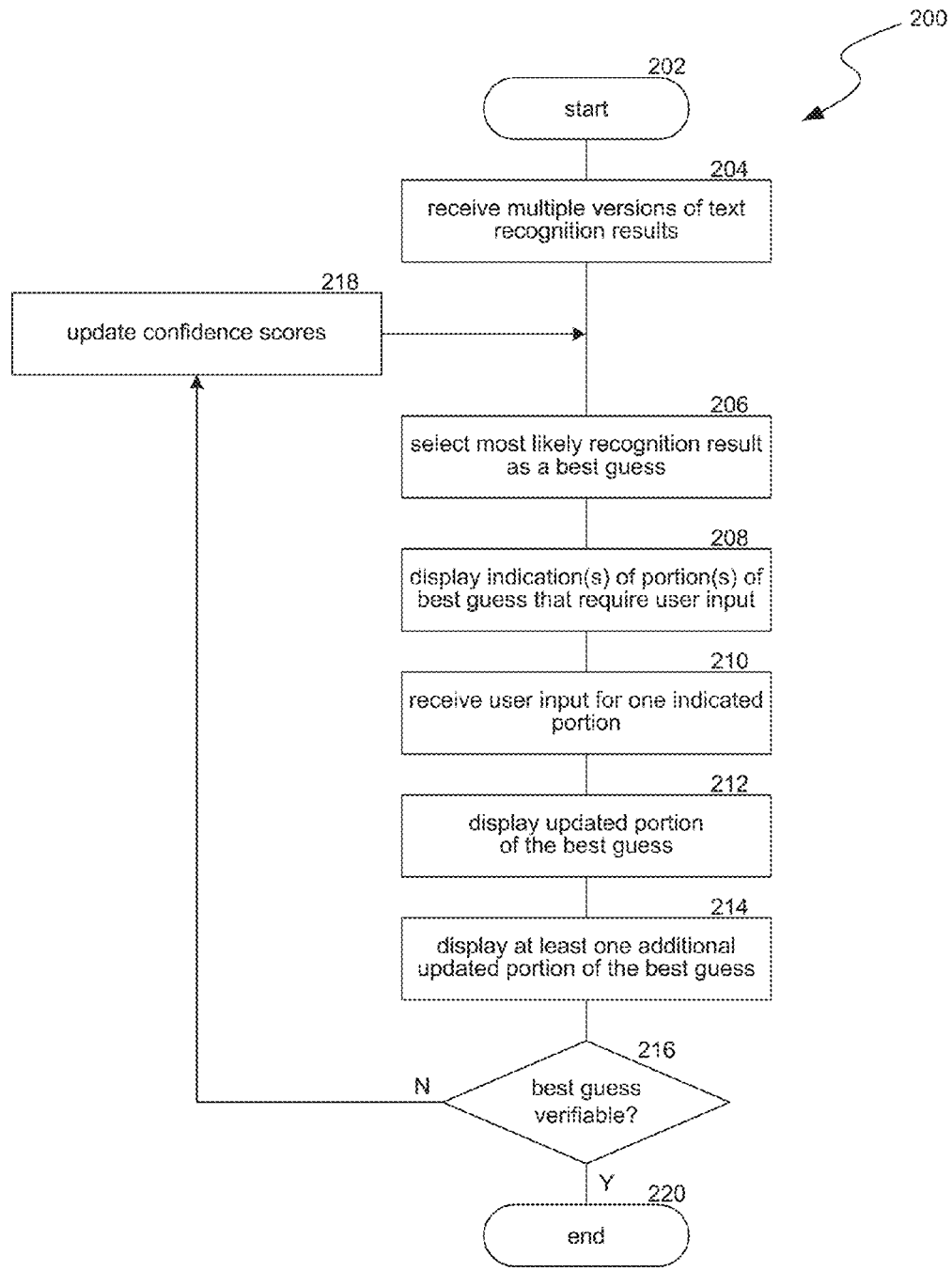
FIG. 2 is a flow diagram illustrating a process used in some embodiments for identifying multiple characters of printed account data based on a single character selection.

FIG. 2 is a flow diagram illustrating a process 200 used in some embodiments for identifying multiple characters of printed account data based on a single character selection. Process 200 begins at block 202 and continues to block 204. At block 204 multiple versions of text recognition results that were generated for one or more images of a financial transaction card are received. The text recognition results can be limited to one or more portions of the printed account data shown in the image of the financial transaction card, such as the account number, or can include other data shown in the image of the financial transaction card, such as the expiration date, card holder name, or cvv. As discussed above in relation to block 116, versions of text recognition results, and subparts thereof, can have an associated confidence score. In some implementations, only a certain number of text recognition results, such as 10, or only text recognition results with a confidence score above a specified threshold, are received or used by process 200.

At block 206, a version of the text recognition results with a highest confidence score can be selected as a best guess. The highest confidence score can be a score assigned to the best guess or can be an aggregation of multiple confidences scores assigned to subparts of the best guess.

At block 208, a display is presented indicating one or more portions of the best guess that require input to sufficiently identify one or more of the characters. In some implementations, the portions of the best guess that are indicated are characters that have a confidence score below a particular threshold, referred to herein as "characters to verify." For example, the best guess can be an account number with sixteen characters. Twelve of these may have a confidence score above a 95% threshold confidence level. The best guess can be displayed allowing a user to select one of the four characters below the threshold, the characters to verify, such as by making a selection with a number pad, turning a virtual scroll wheel, making a selection from a dropdown, or providing some other character indicator. In some implementations, the options available for input selection can be limited based on the received versions of the text recognition results. In various implementations, the options available for selection for a particular character position of the best guess can be the set of characters in that character position from all the versions of text recognition results received at block 204 or can be the set of characters in that character position from the versions of text recognition results received at block 204 that have a confidence score for this character position above a threshold. As an example of this second variation, the best guess can be an account number with sixteen characters where the third character of the best guess, "8," has a confidence score below a 95% threshold confidence level. Along with the best guess version of the text recognition results, there can be four other versions of the text recognition results that have a confidence score for the third character above a 20% threshold level. The third position characters for these versions of the text recognition results could be "2," "4," "4," and "7." The options presented for selection for the third position character could then be the union of these characters and the character indicated for the best guess in the character position: "2," "4," "7," and "8." In some implementations, the character position that is presented for selection can be chosen by determining which character selection will narrow the possibilities for other character positions the most. Updating other character positions based on a selection for particular character position is discussed below in relation to block 214 and FIG. 4. At block 210 input is received selecting a character for one of the character positions indicated by block 208.

At block 212, the display is updated to show the selected character in the indicated character position. At block 214, an analysis of the received versions of the text recognition results is performed in relation to the received character selection to compute at least one other character position in the displayed best guess that can be modified based on the selected character. This can comprise changing the character position from needing further information to no longer needing further information. For example, this can occur where a confidence score is updated above the necessary threshold level to indicate that character position as defined. Once the other character position is defined, the display can be updated to show the character in the character position that is now considered defined.

In some implementations, updating the display in blocks 212 and 214 is accomplished by modifying one or more of the received versions of the text recognition results by setting the selected character in the indicated character position as defined, and determining implications for other character positions, such as by updating confidence scores. In some implementations, updating the display in blocks 212 and 214 is accomplished by eliminating, from the set of received versions of the text recognition results, those versions of the text recognition results that do not match the selected character in the indicated character position. Eliminating versions of the text recognition results is discussed in greater detail below in relation to FIG. 4.

At block 216, the best guess is reviewed to determine whether it can be verified. Verification can include contacting a financial institution and providing at least the updated best guess. The financial institution can then verify that this is accurate account data. In some implementations, additional of the versions of the text recognition results, such as a set number of the remaining versions of the text recognition results with the highest confidence scores, can also be transmitted to the financial institution for attempted verification. Additional information can also be transmitted to the financial institution such as portions of an address, a name, a card expiration, a cvv, a phone number, an email, etc. In some implementations, the verification occurs by a user performing an inspection of the best guess and verifying that it is correct.

If none of the versions of the text recognition results are verified, process 200 continues to block 218. At block 218, confidence scores for any of the various versions of the text recognition results can be updated. In some implementations where individual character confidence scores are conditional on selections at other character positions, versions of the text recognition results can be updated by modifying the individual character confidence scores. For example, where a version of the text recognition results had a 51% confidence score for an "8" character in position 3, and had a 46% confidence score for a "0" character in position 3, and due to the selected character for position 1, "0" is no longer an option for position 3 due to application of the Luhn algorithm, the confidence score for an "8" at position 3 can be recomputed as 97%. In some implementations where individual character confidence scores are not conditional on other character positions, but a total confidence score for a version of text recognition results is conditional on individual character confidence scores for that version, the combined confidence score for a particular version of the text recognition results can be recomputed based on the selected character being attributed a high confidence score. Taking a simplified example where the account data comprises only four numbers, and one of the versions of the text recognition results with corresponding individual character position confidence scores, denoted "character":score, of: {"2":38%, "5":98%; "4":76%, "8":60%}, the initial total confidence score can be the average: 68%. If the selected character is "2" for position 1, this version of the text recognition results can be updated to have the corresponding confidence scores: {"2":100%, "5":98%; "4":78%, "8":60%}, thus the total confidence score can be updated to be the new average: 84%.

From block 218, process 200 continues back to block 206. If a version of the text recognition results is verified at block 216, process 200 continues to block 220, where it ends.

Figure 3:
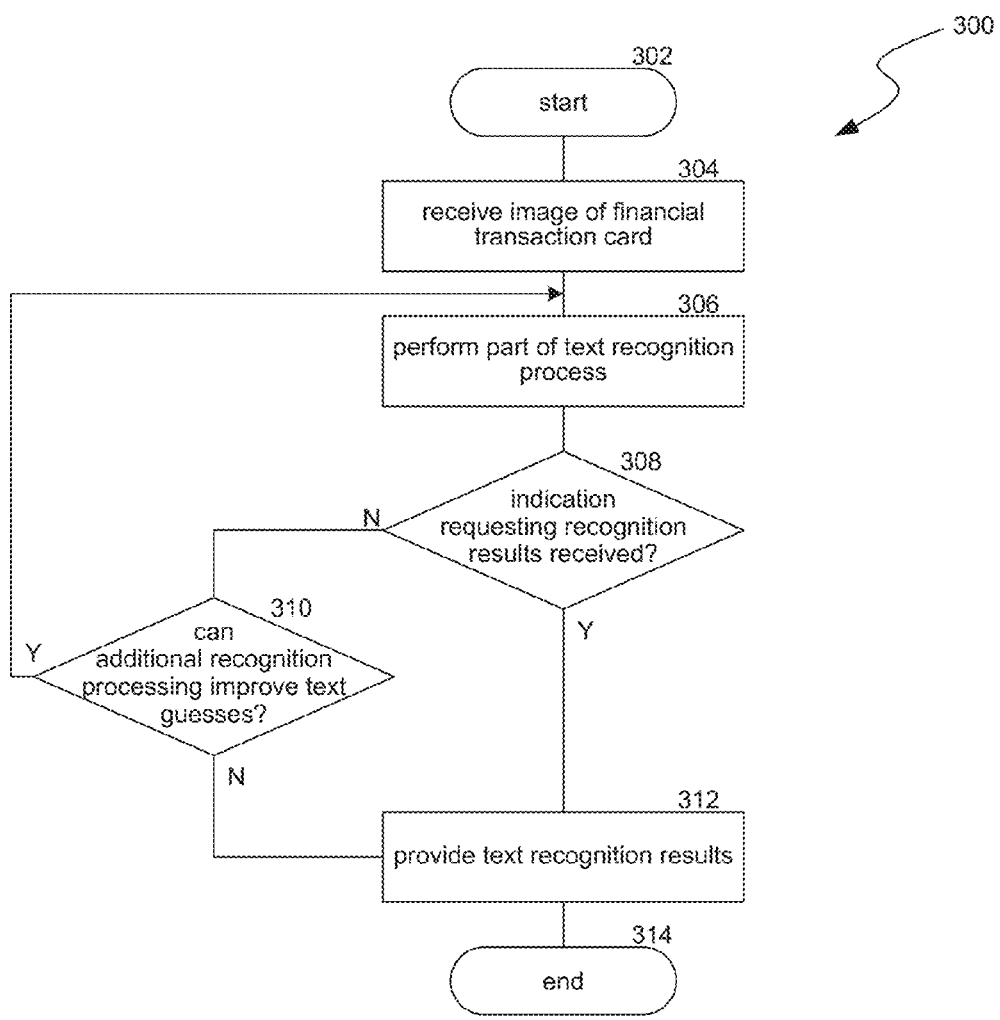
FIG. 3 is a flow diagram illustrating a process used in some embodiments for performing text recognition on a financial transaction card.

FIG. 3 is a flow diagram illustrating a process 300 used in some embodiments for performing text recognition on a financial transaction card with results provided upon receipt of card data. Process 300 begins at block 302 by a server or some other computing device in communication with a device receiving account data. Process 300 continues to block 304, where an image of a financial transaction card is received. Though process 300 is described as using a single image, in some implementations multiple images can be received showing the same or different portions of the financial transaction card. For example the image can include front and back images of the financial transaction card. Alternatively or in addition, the image can include multiple images of the front of the financial transaction card.

At block 306, some text recognition is performed on the image of the financial transaction card. Text recognition can be performed using versions of optical character recognition (OCR). In various implementations, text recognition can use classifiers such as support vector machines or neural networks or more classical OCR algorithms such as a stretch and warp analysis. The text recognition performed the first time process 300 arrives at block 306 can be the minimum amount required to provide a basic text recognition result. Process 300 can be configured such that this initial processing at block 306 continues as long as some minimum confidence level has not been reached for one or more text recognition results and sufficient progress is being made by performing additional processing. The processing performed at block 306 yields text recognition results, which can include one or more versions of text recognition results. In some implementations, these versions, or portions of these versions can be attributed a confidence score as part of the processing at block 306.

At block 308, process 300 checks whether an indication has been received that requests a text recognition result for the image received at block 304. If this indication has been received, which can mean that a user is now ready for these results and further processing can cause a negative user experience, process 300 continues to block 312. If no such indication has been received, process 300 continues to block 310.

At block 310, process 300 computes whether additional processing on the received image is likely to yield an improvement to the current text recognition results. For example, process 300 can determine that additional processing is likely to improve a confidence score for one or more versions of text recognition results or can determine that additional processing is likely to generate addition useful versions of text recognition results. A useful version of the text recognition results can be one that has a confidence score above a specified threshold. If process 300 computes that additional processing is likely to yield an improvement to the current text recognition results, process 300 returns to block 306. If process 300 computes that additional processing is not likely to yield an improvement to the current text recognition results, process 300 continues to block 312.

When process 300 arrives at block 306 other than the first time during a loop between blocks 306 and 310, in some implementations, processing can proceed by performing some quantum of text recognition processing, then polling for the decisions by proceeding to blocks 308 or 310. In other implementations, when process 300 arrives at block 306 other than the first time during a loop between blocks 306 and 310, processing can proceed by continuously performing text recognition processing while concurrently monitoring for a positive decision to block 308 or a negative decision to block 310, at which point text recognition processing of block 306 can be interrupted and process 300 can continue to block 312.

At block 312 the current text recognition results from block 306 can be provided to the device receiving the account data. Process 300 then continues to block 314, where it ends.

Figure 4:
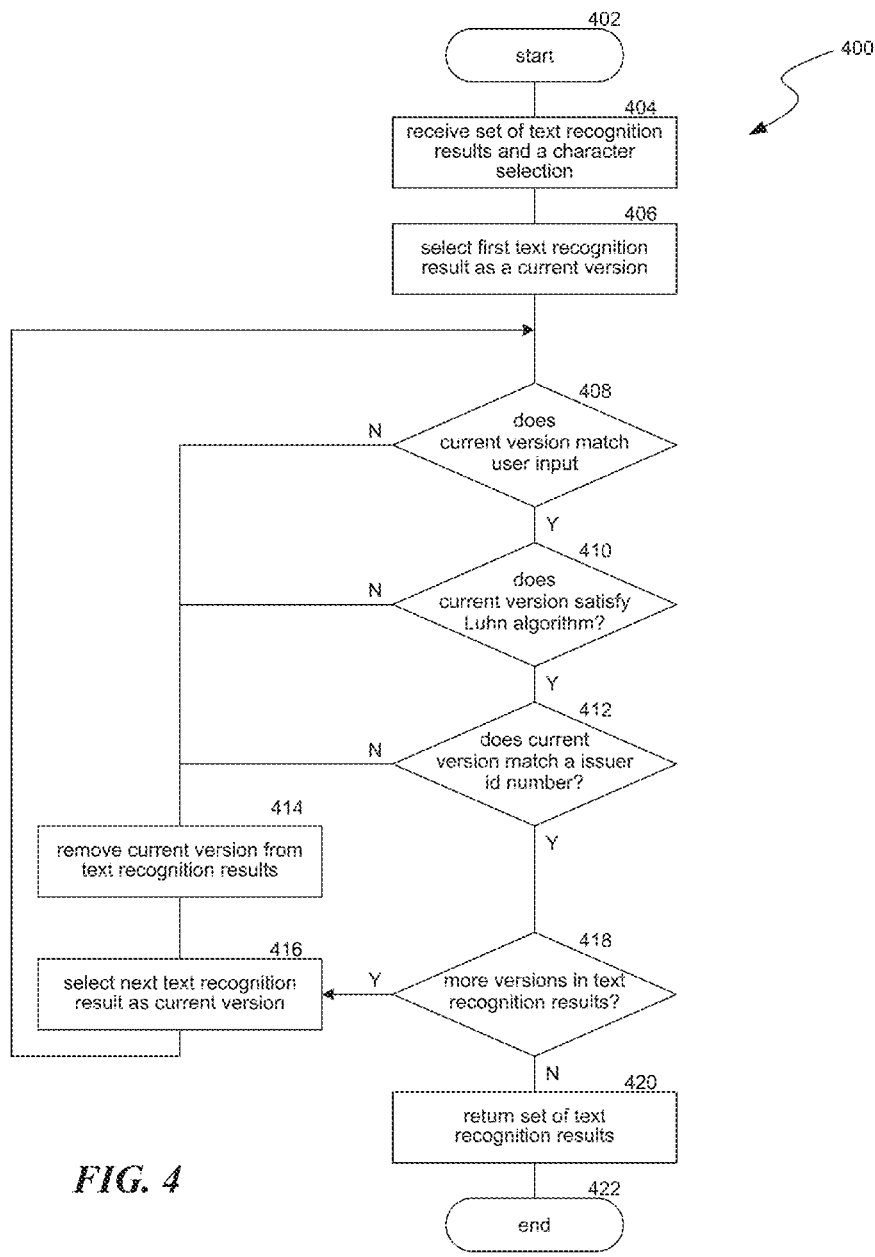
FIG. 4 is a flow diagram illustrating a process used in some embodiments for eliminating incorrect versions of text recognition results based on a character selection.

FIG. 4 is a flow diagram illustrating a process 400 used in some embodiments for eliminating incorrect versions of text recognition results based on a character selection. Process 400 begins at block 402 and continues to block 404. At block 404, a set of versions of text recognition results, as discussed above in relation to block 204, and a character selection for a character position, as discussed above in relation to block 210, are received. At block 406, one of the received versions of the text recognition results can be selected as a current version.

At block 408, process 400 analyzes the current version and if the current version matches the character selection for the character position, process 400 continues to block 410. If the current version does not match the character selection for the character position, process 400 continues to block 414.

At block 410, process 400 analyzes the current version and if the current version satisfies the Luhn algorithm, process 400 continues to block 412. The Luhn algorithm verifies an account number using an included check digit. The account number including the check digit must pass the following test: from the check digit, double the value of every second digit; if the product of this doubling operation is greater than nine, then sum the digits of the products; take the sum of all the digits; the modulus ten of the total must be equal to zero. If the current version does not satisfy the Luhn algorithm, process 400 continues to block 414.

At block 412, process 400 analyzes the current version to determine whether the current version matches one or more known issuer identification numbers. Account numbers often begin with a number identifying which bank or institution issued it. For example, MasterCard numbers begin with a five and have the second number as a 1-5. If the current version matches one or more of the issuer identification numbers the current version is still an eligible version of the text recognition results, so process 400 continues to block 416. If the current version does not match any of the known issuer identification numbers, process 400 continues to block 414.

In some implementations, such as where versions of the text recognition results are conditional and applying the character selection can modify one or more other characters of that version, process 400 can proceed as above where each version of the text recognition results is checked for matching: the character selection, the Luhn algorithm, and known issuer identification numbers. In other implementations, such as where versions of the text recognition results are static, the check for satisfying the Luhn algorithm and known issuer identification numbers can be performed initially on all versions of the text recognition results, either by the server prior to sending the versions of text recognition results or by the recipient upon receiving the versions of text recognition results. This implementation can eliminate versions of the text recognition results that do not satisfy these conditions in a single check, avoiding unnecessary rechecking of these conditions upon each character selection.

At block 414, based on one of the determinations made at block 408, 410, or 412, process 400 has computed that the current version: does not match the character selection, does not satisfy the Luhn algorithm, or does not match any of the known issuer identification numbers. Thus, at block 414, it is very unlikely that the current version identifies the correct account data from the image of the financial transaction card. Accordingly, the current version can be removed from the set of versions of the text recognition results.

At block 416, process 400 computes whether the current version is the last version in the set of versions of the text recognition results. If the current version is the last version in the set of versions of the text recognition results, process 400 continues to block 420. If the current version is not the last version in the set of versions of the text recognition results, process 400 continues to block 418. At block 418, the next version of the text recognition results is selected as the current version. This selection enables the loop between block 408-418 to evaluate each version of the text recognition results.

At block 420, each version of the text recognition results has been evaluated by the loop between blocks 408-418 and the remaining versions of the text recognition results; those that have not been eliminated at block 414 are the versions that are still candidates for identifying the correct account data. At block 420, this remaining set of versions of the text recognition results is returned. Process 400 then continues to block 422, where it ends.

Figure 5:
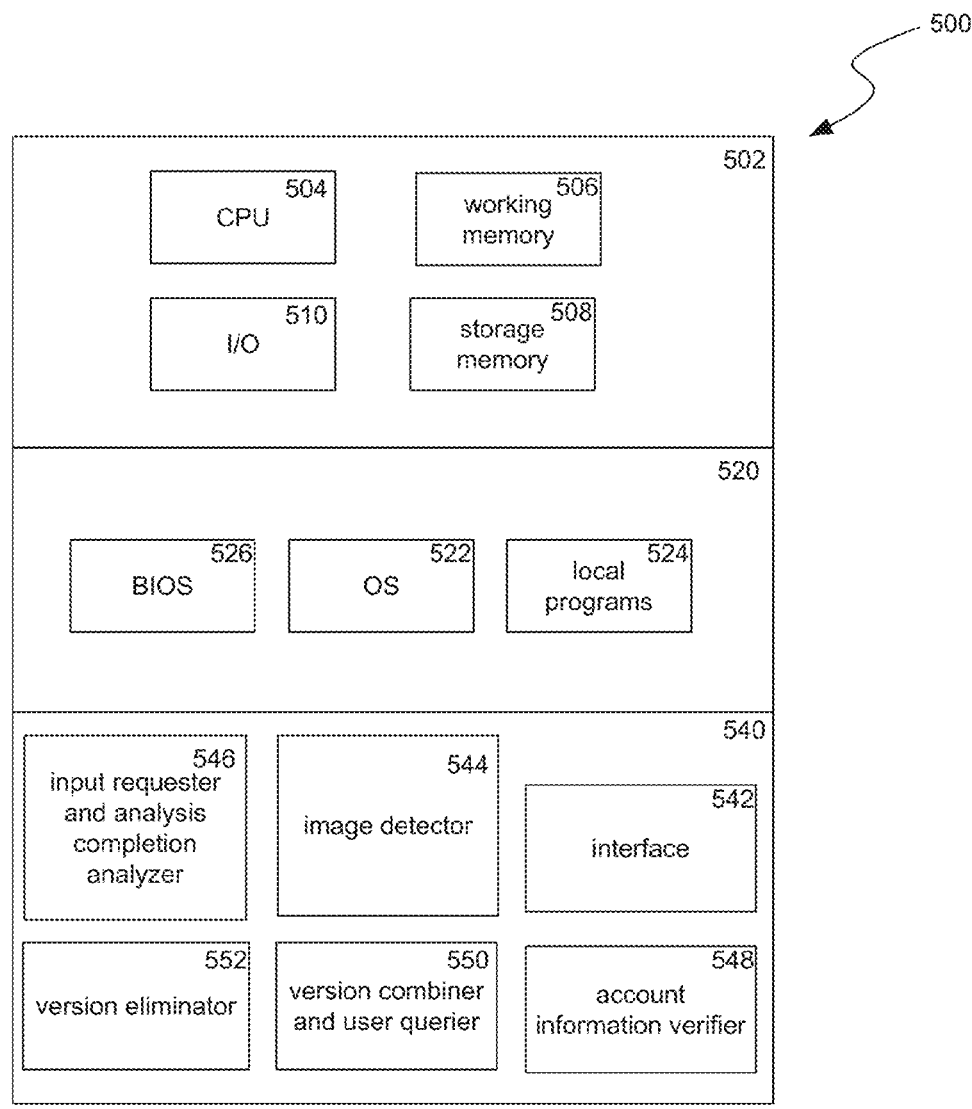
FIG. 5 is a block diagram illustrating components which, in some embodiments, can be used in a system implementing the disclosed technology.

FIG. 5 is a block diagram illustrating components 500 which, in some embodiments, can be used in a system implementing the disclosed technology. The components 500 include hardware 502, general software 520, and specialized components 540. As discussed in more detail below, a system implementing the disclosed technology can use various hardware including a central processing unit 504, working memory 506, storage memory 508, and input and output devices 510. Components 500 can be implemented in a client computing device such as client computing devices 705 or on a server computing device, such as server computing devices 710 or 720 discussed below.

General software 520 can include various applications including an operating system 522, local programs 524, and a BIOS 526. Specialized components 540 can be subcomponents of a general software application 520, such as a local program 524. Specialized components 540 can include image detector 544, input requester and analysis completion analyzer 546, account information verifier 548, version combiner and user querier 550, version eliminator 552, and components which can be used for controlling and receiving data from the specialized components, such as interface 542.

Image detector 544 can be configured to interface with an input device to obtain one or more images of a financial transaction card. This input device can be a camera of I/O 510, a communication interface of I/O 510, or storage memory 508. Image detector 544 can also provide guidance on how a camera should be operated to obtain the one or more images. For example, image detector 544 can provide overlays on a screen of I/O 510 that direct one or more of: card alignment, camera distance, or lighting conditions. The overlay can be configured to optimize image quality for recognizing account data associated with a payment account imprinted on the financial transaction card. Image detector 544 can send, using a communication interface of I/O 510, the retrieved images to a server for text recognition processing.

Input requester and analysis completion analyzer 546 can be configured to, while the images are being sent to the server or while text recognition processing is being performed by the server, obtain additional account data from a user such as a zip code, cvv, or cardholder name. Input requester and analysis completion analyzer 546, when the additional account data has been received, can also check to determine whether text recognition results have been received through a communication interface of I/O 510. If not, input requester and analysis completion analyzer 546 can send a message to the server using the communication interface of I/O 510 that indicates text recognition results are needed.

When text recognition results are received through a communication interface of I/O 510, they can be passed to account information verifier 548. Account information verifier 548 can verify that received text recognition results are correct. This determination can include contacting a financial institution that issued the financial transaction card and providing the text recognition results. The financial institution can then verify that this is accurate account data. In some implementations, the verification occurs by displaying the text recognition results on a display of the I/O 510 and receiving a user input verifying it is correct. In some implementations, a version of the text recognition results is selected according to a highest confidence score, and no separate verification is performed.

In some implementations, where the text recognition results include multiple versions, the validity determination can include using version combiner and user querier 550 and version eliminator 552 to first eliminate some of the versions of text recognition results. Version combiner and user querier 550 can review the received versions of text recognition results and determine character positions that are sufficiently defined and others that need additional selections to be sufficiently defined. Based on these classifications for character positions, version combiner and user querier 550 can utilize a component of I/O 510 to provide a query to a user for a selection for one or more character positions that are not sufficiently defined. When such a user selection is received through I/O 510, it can be passed to version eliminator 552. Version eliminator 552 can eliminate those received versions of text recognition results that do not match the user selection; that, based on the user selection, do not satisfy the Luhn algorithm; or that do not match any known issuer identification numbers.

Figure 6:
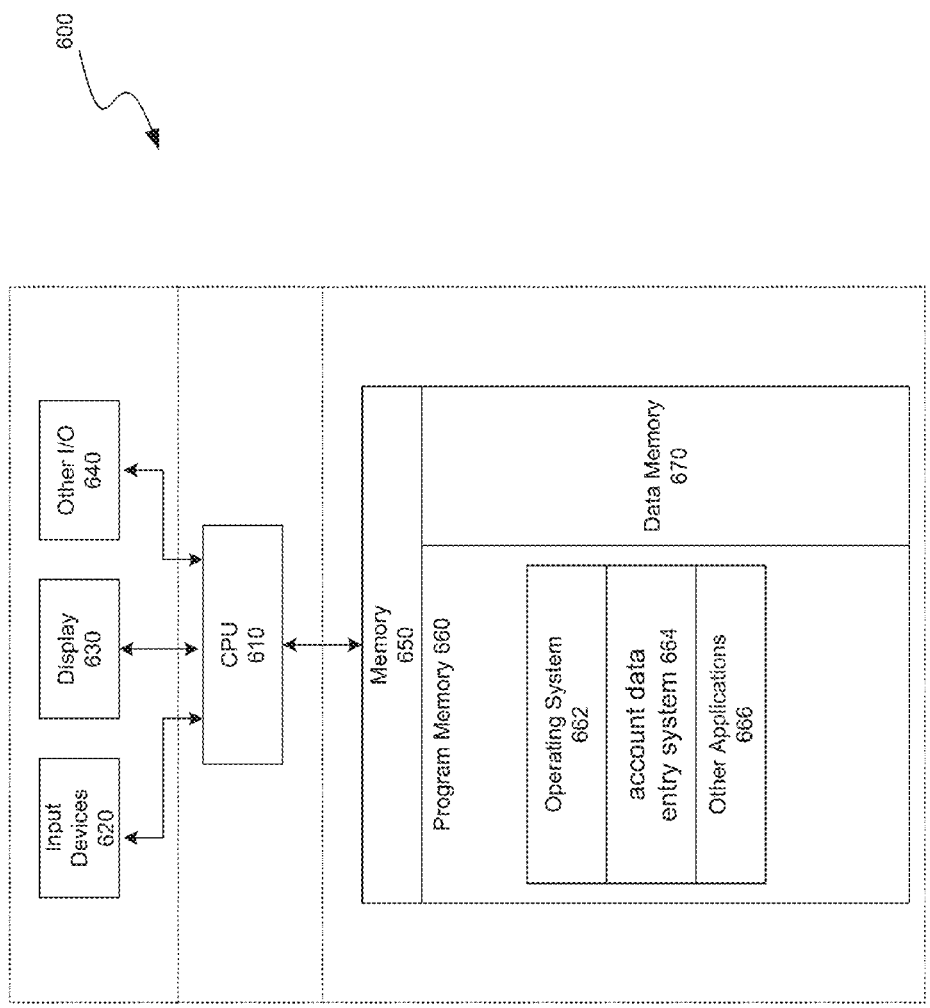
FIG. 6 is a block diagram illustrating an overview of devices on which some embodiments of the disclosed technology can operate.

FIG. 6 is a block diagram illustrating an overview of devices 600 on which some embodiments of the disclosed technology may operate. Device 600 can include one or more input devices 620 that provide input to the CPU (processor) 610, notifying it of actions. The actions are typically mediated by a hardware controller that interprets the signals received from the input device and communicates the information to the CPU 610 using a communication protocol. Input devices 620 include, for example, a mouse, a keyboard, a touchscreen, an infrared sensor, a touchpad, a wearable input device, a camera- or image-based input device, a microphone, or other user input devices.

CPU 610 can be a single processing unit or multiple processing units in a device or distributed across multiple devices. CPU 610 can be coupled to other hardware devices, for example, with the use of a bus, such as a PCI bus or SCSI bus. The CPU 610 can communicate with a hardware controller for devices, such as for a display 630. Display 630 can be used to display text and graphics. In some examples, display 630 provides graphical and textual visual feedback to a user. In some implementations, the display includes the input device as part of the display, such as when the input device is a touchscreen or is equipped with an eye direction monitoring system. In some implementations, the display is separate from the input device. Examples of display devices are: an LCD display screen, an LED display screen, a projected display (such as a heads-up display device or a head-mounted device), and so on. Other I/O devices 640 can also be coupled to the processor, such as a network card, video card, audio card, USB, firewire or other external device, a magnetic or near field card reader, camera, printer, speakers, CD-ROM drive, DVD drive, disk drive, or Blu-Ray device.

In some implementations, the device 600 also includes a communication device capable of communicating wirelessly or wire-based with a network node. The communication device can communicate with another device or a server through a network using, for example, TCP/IP protocols. Device 600 can utilize the communication device to distribute operations across multiple network devices.

The CPU 610 has access to a memory 650. A memory includes one or more of various hardware devices for volatile and non-volatile storage, and can include both read-only and writable memory. For example, a memory can comprise random access memory (RAM), CPU registers, read-only memory (ROM), and writable non-volatile memory, such as flash memory, hard drives, wire arrangements, floppy disks, written bar or QF codes, CDs, DVDs, magnetic storage devices or strips, tape drives, device buffers, and so forth. A memory is not a propagating signal divorced from underlying hardware; a memory is thus non-transitory. Memory 650 includes program memory 660 that stores programs and software, such as an operating system 662, account data entry system 664, and any other application programs 666. Memory 650 also includes data memory 670 that can include financial transaction card images, versions of text recognition results, issuer identification numbers, imaging instructions and overlays, stored account information, threshold values, configuration data, settings, and options or preferences which can be provided to the program memory 660 or any element of the device 600.

The disclosed technology is operational with numerous other general purpose or special purpose computing system environments or configurations. Examples of well-known computing systems, environments, and/or configurations that may be suitable for use with the technology include, but are not limited to, personal computers, server computers, handheld or laptop devices, cellular telephones, wearable electronics, tablet devices, multiprocessor systems, microprocessor-based systems, set-top boxes, programmable consumer electronics, network PCs, minicomputers, mainframe computers, distributed computing environments that include any of the above systems or devices, and the like.

Figure 7:
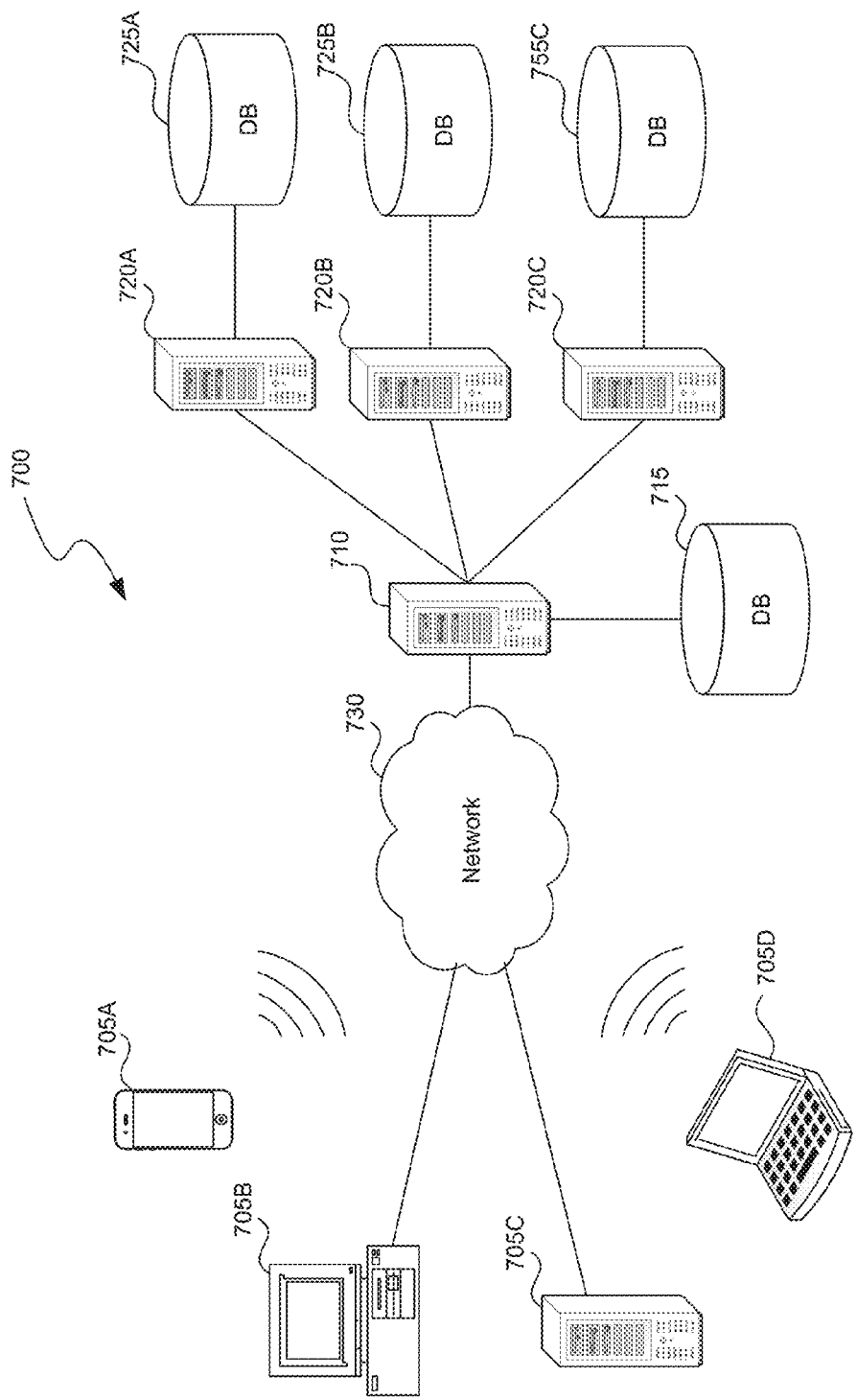
FIG. 7 is a block diagram illustrating an overview of an environment in which some embodiments of the disclosed technology can operate.

FIG. 7 is a block diagram illustrating an overview of an environment 700 in which some embodiments of the disclosed technology may operate. Environment 700 can include one or more client computing devices 705A-D, examples of which may include device 600. Client computing devices 705 can operate in a networked environment using logical connections 710 through network 730 to one or more remote computers such as a server computing device.

In some implementations, server 710 can be an edge server which receives client requests and coordinates fulfillment of those requests through other servers, such as servers 720A-C. Server computing devices 710 and 720 can comprise computing systems, such as device 600. Though each server computing device 710 and 720 is displayed logically as a single server, server computing devices can each be a distributed computing environment encompassing multiple computing devices located at the same or at geographically disparate physical locations. In some implementations, each server 720 corresponds to a group of servers.

Client computing devices 705 and server computing devices 710 and 720 can each act as a server or client to other server/client devices. Server 710 can connect to a database 715. Servers 720A-C can each connect to a corresponding database 725A-C. As discussed above, each server 720 can correspond to a group of servers, and each of these servers can share a database or can have their own database. Databases 715 and 725 can warehouse (e.g. store) information such as financial transaction card images, versions of text recognition results, issuer identification numbers, imaging instructions and overlays, stored account information, threshold values. Though databases 715 and 725 are displayed logically as single units, databases 715 and 725 can each be a distributed computing environment encompassing multiple computing devices, can be located within their corresponding server, or can be located at the same or at geographically disparate physical locations.

Network 730 can be a local area network (LAN) or a wide area network (WAN), but can also be other wired or wireless networks. Network 730 can be the Internet or some other public or private network. The client computing devices 705 can be connected to network 730 through a network interface, such as by wired or wireless communication. While the connections between server 710 and servers 720 are shown as separate connections, these connections can be any kind of local, wide area, wired, or wireless network, including network 730 or a separate public or private network.

Several embodiments of the disclosed technology are described above in reference to the figures. The computing devices on which the described technology may be implemented can include one or more central processing units, memory, input devices (e.g., keyboard and pointing devices), output devices (e.g., display devices), storage devices (e.g., disk drives), and network devices (e.g., network interfaces). The memory and storage devices are computer-readable storage media that can store instructions that implement at least portions of the described technology. In addition, the data structures and message structures can be stored or transmitted via a data transmission medium, such as a signal on a communications link. Various communications links can be used, such as the Internet, a local area network, a wide area network, or a point-to-point dial-up connection. Thus, computer-readable media can comprise computer-readable storage media (e.g., "non-transitory" media) and computer-readable transmission media.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

The invention claimed is:

1. A method, performed on a mobile computing device, for reducing a number of user corrections entered to obtain a correct account number for a financial transaction card, the method comprising:
    obtaining, at the mobile computing device, multiple versions of text recognition results,
        wherein each version of the text recognition results is associated with a total confidence score;
    displaying, by the mobile computing device, a visual representation of a best guess comprising a version of the text recognition results that is associated with a highest total confidence score;
    receiving, by the mobile computing device, a user selection, as a selected character from at least one of a plurality of characters to verify from the best guess selected based on individual confidence scores,
    wherein the multiple versions of the text recognition results are updated by performing one or more of:
        eliminating, from the multiple versions of text recognition results, one or more of the multiple versions of text recognition results that do not match the selected character;
        eliminating, from the multiple versions of text recognition results, one or more of the multiple versions of text recognition results that do not satisfy the Luhn algorithm;
        eliminating, from the multiple versions of text recognition results, one or more of the multiple versions of text recognition results that do not match any of multiple known issuer identification numbers;
        updating the total confidence score for the multiple versions of text recognition results; or
        any combination thereof; and
    updating, by the mobile computing device, the visual representation to display a new best guess from the remaining versions of the text recognition results,
    wherein the new best guess comprises at least:
        a first difference from the best guess that is a change of a first character in the best guess to the selected character, and
        a second difference from the best guess that is a change of a second character in the best guess other than to the selected character.

2. The method of claim 1 further comprising:
    verifying that the new best guess includes the correct account number by:
        sending a proposed account number associated with the new best guess to a financial institution; and
        receiving, from the financial institution, a confirmation that the proposed account number associated with the new best guess indicates valid account data.

3. The method of claim 2 further comprising:
    sending the verified correct number associated with the new best guess to a server,
        wherein the server is configured to link the financial transaction card to a service provided by a payment service system by storing the verified correct account number associated with the new best guess, in a database, with an association to a user and the service provided by the payment service system.

4. The method of claim 2 further comprising:
    sending the verified correct account number associated with the new best guess to a server, wherein the server is configured to perform a transaction using the verified correct account number associated with the new best guess.

5. A system for reducing a number of user corrections entered to obtain a correct account number comprising:
    a memory;
    a display; and
    one or more processors configured to execute:
        an input component configured to receive a correction character corresponding to a character displayed in a visual representation on the display, the correction character indicating a difference between a best guess text recognition result and the correct account number; and
        a best guess updater component configured to select a new best guess based on the correction character and update the visual representation on the display with the new best guess;
        wherein the new best guess includes at least:
            a first difference from the best guess that is the correction character, and
            a second difference from the best guess, other than the first difference, indicating a difference between the best guess and the correct account number.

6. The system of claim 5,
    wherein the best guess is identified by selecting a text recognition result version that is associated with a highest total confidence score; and
    wherein the new best guess is identified by selecting a text recognition result version with an updated highest total confidence score.

7. The system of claim 5,
    wherein the system is integrated in a mobile computing device;
    wherein the system further comprises a transceiver configured to receive, from a server, multiple versions of text recognition results, wherein the best guess and new best guess are selected from multiple versions of text recognition results received through the transceiver;

wherein the system further comprises a display configured to display a representation of the best guess with one or more input areas indicating characters of the best guess which are candidates for receiving the correction character; and wherein the correction character is received through a user selection to one of the input areas by actuating the input.

* * * * *